US009092744B2

(12) United States Patent
Tito

(10) Patent No.: US 9,092,744 B2
(45) Date of Patent: Jul. 28, 2015

(54) GRAPHIC VISUALIZATION FOR LARGE-SCALE NETWORKING

(75) Inventor: Meni Tito, Kfar Saba (IL)

(73) Assignee: SAP Portals Israel Ltd, Ra'anana (IL)

( * ) Notice: Subject to any disclaimer, the term of this patent is extended or adjusted under 35 U.S.C. 154(b) by 281 days.

(21) Appl. No.: 13/449,516

(22) Filed: Apr. 18, 2012

(65) Prior Publication Data
US 2013/0282889 A1 Oct. 24, 2013

(51) Int. Cl.
*G06F 15/173* (2006.01)
*G06Q 10/00* (2012.01)
*G06Q 10/10* (2012.01)
*G06Q 50/00* (2012.01)
*G09B 29/00* (2006.01)
*H04L 12/24* (2006.01)

(52) U.S. Cl.
CPC .............. *G06Q 10/00* (2013.01); *G06Q 10/101* (2013.01); *G06Q 50/01* (2013.01); *G09B 29/00* (2013.01); *H04L 12/2418* (2013.01); *H04L 41/12* (2013.01); *H04L 41/22* (2013.01)

(58) Field of Classification Search
USPC ........................................................ 709/224
See application file for complete search history.

(56) References Cited

U.S. PATENT DOCUMENTS

| 8,577,827 | B1* | 11/2013 | Sehn et al. ....................... 706/52 |
| 2005/0159970 | A1* | 7/2005 | Buyukkokten et al. ........... 705/1 |
| 2009/0049378 | A1 | 2/2009 | Carmel et al. |
| 2011/0025706 | A1* | 2/2011 | Etelapera ...................... 345/619 |
| 2011/0093430 | A1* | 4/2011 | B'Far et al. ..................... 706/55 |
| 2013/0212479 | A1* | 8/2013 | Willis et al. ................... 715/736 |

* cited by examiner

*Primary Examiner* — Angela Nguyen
(74) *Attorney, Agent, or Firm* — Fish & Richardson P.C.

(57) ABSTRACT

Systems, computer implemented methods, and engines are directed to identifying a network of associations for a user. A visualization of the network of associations may be provided as a graph, the graph having an edge and a node, the node representing a member of the network of associations and the edge representing an association between the member and the user.

21 Claims, 10 Drawing Sheets

GRAPHIC VISUALIZATION FOR LARGE-SCALE NETWORKING

TECHNICAL FIELD

This invention relates to graphic visualization for large-scale networking, and more particularly to providing a visual representation for large-scale, multi-layered social networks.

BACKGROUND

Layout rendering engines can render large-scale complex social network graphs. These social networks may contain multi-layered data that includes group associations, hierarchical organization relevancy, behavior patterns, user relevancy, priority, frequency, etc.

SUMMARY

Systems, including memory and one or more hardware processors, engines, and computer implemented methods may be directed to identifying a network of associations for a user. A visualization of the network of associations may be provided as a graph, the graph having an edge and a node, the node representing a member of the network of associations and the edge representing an association between the member and the user.

In certain aspects, the network of associations may include multi-layered data. The multi-layered data may include one or more of group associations, hierarchical organization relevancy, behavior patterns, relevancy, priority, frequency, while maintaining user navigation history.

Certain aspects of the implementations include providing a visualization of node clusters based, at least in part on, availability of space on a display upon which the graph is displayed, the node clusters comprising one or more nodes. Providing the visualization of node clusters may be further based on a relevancy factor of nodes in the nodes cluster.

In certain aspects of the implementations, the nodes are visualized having visual characteristics for providing a visual representation of the relevancy to a user selected visualization preference.

Certain aspects of the implementations include providing a recommendation to the user to adjust the graph based on a metric associated with the network of associations. Certain aspects of the implementations include tracking a viewing history for the user.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present disclosure pertains to providing visual representations of large scale complex network (e.g., social networks) data with a dynamic layout rendering engine for determining graph nodes and edges representative of network associations. Network associations are relevant to the rendering process according to, for example, their relevancy, priority, frequency, user provided rating, probability, etc., while taking the screen dimensions and proportions into account. The figures and accompanying text provided herein illustrate the concept of the layout rendering engine, which renders complex network graphs. These networks may contain multi-layered data that includes group associations, hierarchical organization relevancy, behavior patterns, relevancy, priority, frequency, etc., while maintaining user navigation history. The network data can be visualized to the user as a network graph holding different edge types for representing connection data, weights, and strengths. Nodes are rendered in different sizes, colors, and/or other visual cues for illustrating relevancy to the current view of the observing user. Dynamic calculation of node group clustering is performed for fitting the output graph to the viewport available size according to the graph nodes relevancy. A rating mechanism is suggested to the user for fine-tuning the output graph and for customizing the current view of the observing user. The layout rendering engine keeps track of user interaction and navigation history, allowing the user to go back and forth between recently viewed social network representations.

Figure 1:
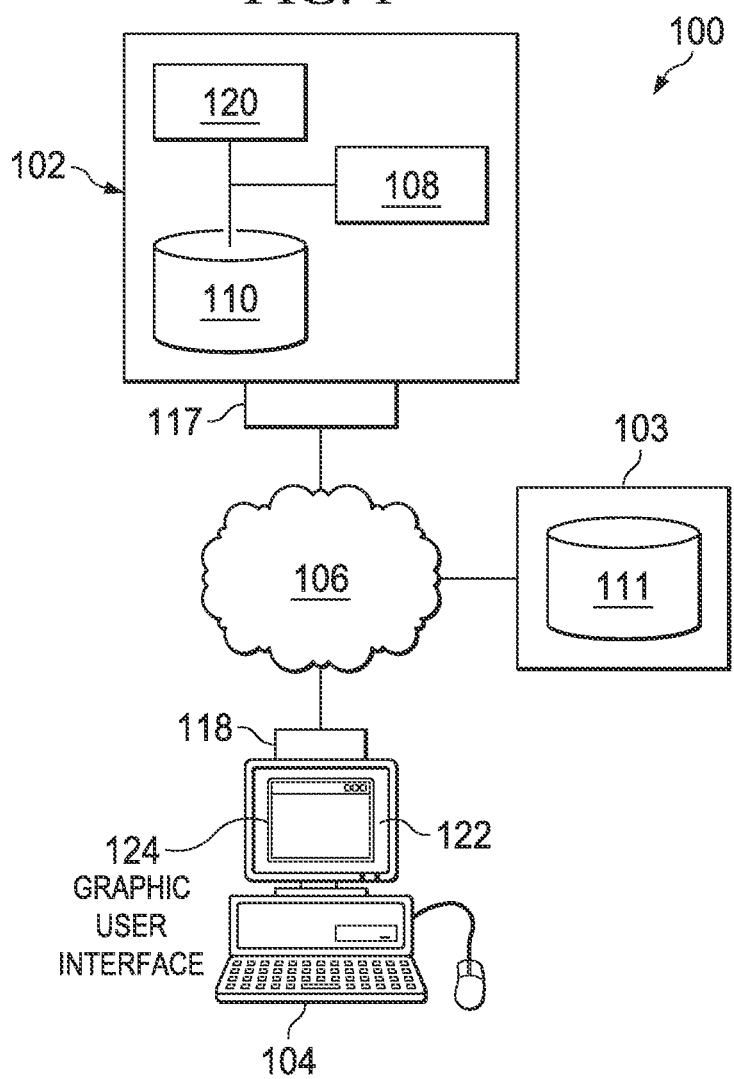
FIG. 1 is a block diagram of an example system for providing a visualization of a network graph.

FIG. 1 is a schematic illustration of an example system 100 for providing a graphic visualization for large-scale networking. System 100 includes a server 102 and a client 104. The server 102 and the client 104 communicate across a network 106.

Server 102 includes a processor 120 that can execute a rendering engine 108. Rendering engine 108 renders a visualization of large scale complex networks as a graph that takes into account priority, frequency, relevancy, and group association. Rendering engine 108 adds full customization to the calculated view and keeps track of user interaction for graph navigation history. The rendering engine 108 makes use of data stored in memory 110 or received across network 106 from, for example, a server 103 associated with social or business networking websites, employers, gaming networks, blogs or other subscription sites, or other locations where information pertaining to network associations is kept. The rendering engine 108 can keep track of navigation history to enhance the browsing experience throughout different networks, for example, by allowing the user to go back and forth between recently viewed social network representations. The rendering engine 108 can customize the visual representation using provided scores and/or ratings for social entities, hiding/showing specific nodes that will be persisted for future view rendering for the logged-in user, and/or switching between available social network data relevant for the viewed entity.

Server 102 includes processor 120. Processor 120 executes instructions and manipulates data to perform the operations of server 102 such as, for example, executing rendering engine 108 to provide a graphical visualization of network associations. Processor 120 can be a central processing unit (CPU), a blade, an application specific integrated circuit (ASIC), a field-programmable gate array (FPGA), or other processor. Although FIG. 1 illustrates a single processor 120 in server 102, multiple processors may be used according to particular needs and reference to processor 120 is meant to include multiple processors where applicable.

Server 102 may be any computer or processing device such as a mainframe, a blade server, general-purpose personal computer (PC), Macintosh, workstation, UNIX-based computer, or any other suitable device. Generally, FIG. 1 provides merely one example of computers that may be used with the disclosure. In other words, the present disclosure contemplates computers other than general purpose computers as well as computers without conventional operating systems. As used in this document, the term "computer" is intended to encompass a personal computer, workstation, network computer, or any other suitable processing device. For example, although FIG. 1 illustrates one server 102 that may be used with the disclosure, system 100 can be implemented using computers other than servers, as well as a server pool. Server 102 may be adapted to execute any operating system including z/OS, Linux-Intel or Linux/390, UNIX, Windows Server, or any other suitable operating system. According to one implementation, server 102 may also include or be communicably coupled with a web server and/or an SMTP server.

Server 102 may also include interface 117 for communicating with other computer systems, client 104, or over network 106 in a client-server or other distributed environment. In certain implementations, server 102 receives requests for data access from local or remote senders through interface 117 for storage in memory 110 and/or processing by processor 120. Generally, interface 117 comprises logic encoded in software and/or hardware in a suitable combination and operable to communicate with network 106. More specifically, interface 117 may comprise software supporting one or more communication protocols associated with communications network 106 or hardware operable to communicate physical signals. Client 104 may also include a network interface 118, which is similar to interface 117, and allows client 104 to communicate across network 106.

Memory 110 may include any memory or database module and may take the form of volatile or non-volatile memory including, without limitation, magnetic media, optical media, random access memory (RAM), read-only memory (ROM), removable media, or any other suitable local or remote memory component.

Network 106 facilitates wireless or wireline communication between computer server 102 and any other local or remote computer, such as client 104. Network 106 may be a continuous network without departing from the scope of this disclosure, so long as at least portion of network 106 may facilitate communications between senders and recipients of requests and results. In other words, network 106 encompasses any internal and/or external network, networks, subnetwork, or combination thereof operable to facilitate communications between various computing components in system 100. Network 106 may communicate, for example, Internet Protocol (IP) packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

System 100 also includes a client 104 in communication with server 102 and other servers 103 across network 106. It will be understood that there may be any number of clients communicably coupled to server 102. This disclosure contemplates that many clients may use a computer or that one user may use multiple computers to submit or review queries via a graphical user interface. As used in this disclosure, clients may operate remote devices, such as personal computers, touch screen terminals, workstations, network computers, kiosks, wireless data ports, wireless or wireline phones, personal data assistants (PDA), one or more processors within these or other devices, or any other suitable processing device, to execute operations associated with business applications. For example, client 104 may comprise a computer that includes an input device, such as a keypad, touch screen, mouse, or other device that can accept information, and an output device that conveys information associated with the operation of server 102 or client 104, including digital data, visual information, or graphical user interface (GUI) 124. For example, rendering engine 108 may provide a graphic visualization of network associations, which can be displayed to the user on a display 122 that displays a GUI 124 through which the user can view, manipulate, edit, etc., the graph of the network associations. Both the input device and output device may include fixed or removable storage media such as a magnetic computer disk, CD-ROM, or other suitable media to both receive input from and provide output to users of client 104 through the display 122, namely over GUI 124.

GUI 124 includes a graphical user interface operable to allow the user of client 104 to interface with at least a portion of system 100 for any suitable purpose, including viewing, manipulating, editing, etc., graphic visualizations of network associations. Generally, GUI 124 provides the user of client 104 with an efficient and user-friendly presentation of data provided by or communicated within system 100. GUI 124 may comprise a plurality of customizable frames or views having interactive fields, pull-down lists, and buttons operated by the user. In one implementation, GUI 124 presents information associated with queries and buttons and receives commands from the user of client 104 via one of the input devices. Moreover, it should be understood that the terms graphical user interface and GUI may be used in the singular or in the plural to describe one or more graphical user interfaces and each of the displays of a particular graphical user interface. Therefore, GUI 124 contemplates any graphical user interface, such as a generic web browser or touch screen, which processes information in system 100 and efficiently presents the results to the user. Server 102 can accept data from client 104 via the web browser (e.g., Microsoft Internet Explorer or Mozilla Firefox) and return the appropriate HTML or XML responses using network 106. For example, server 102 may receive a request from client 104 using a web browser or application specific graphical user interface, and then may execute the request to store and/or retrieve information pertaining to graphs of networks of associations.

Figure 2:
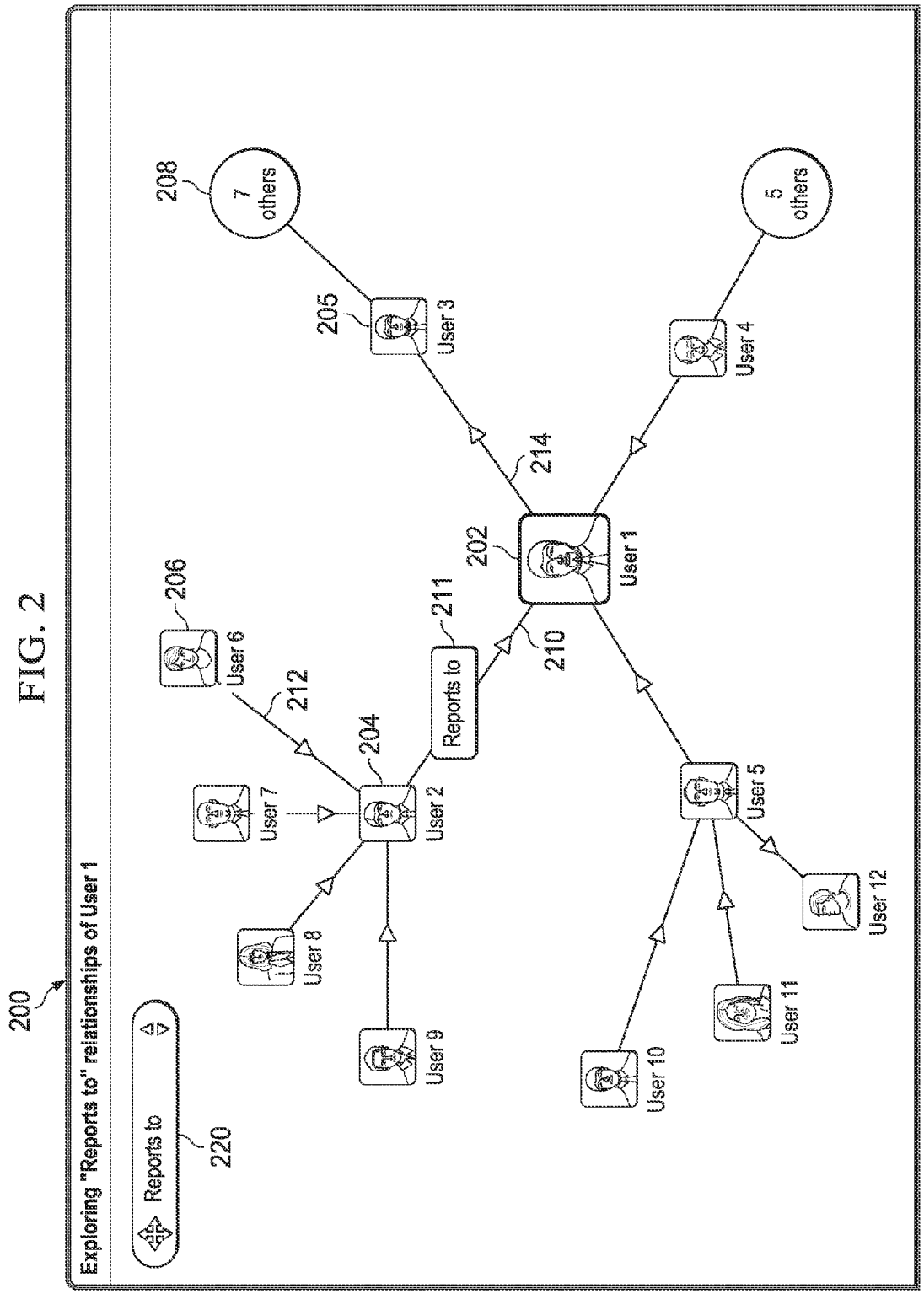
FIG. 2 is a schematic of an example graph visualizing a network of associations.

FIG. 2 is a schematic of an example graph 200 visualizing a network of associations. Graph 200 shows a graph of one example association for subject 202. In this case, the GUI provides for a list of associations as a pull down menu 220, and graph 200 shows the "reports to" associations for subject 202. Subject 202 and his reports to associations are shown as an icon with a photograph thumbnail of the associates. The photograph thumbnail icon can be generated by the rendering engine 108, as shown in FIG. 1, from data received from the server storing the information used to generate the graph. The subject 202 and the associates are nodes of the graph, while the associations between the subject 202 and the associates are edges of the graph. The nodes and edges can each vary in size, color, strength (thickness, boldness, etc.), or other visual cues depending on the relevancy, proximity, or other characteristic the associate or association has to the subject 202. Graph nodes represent different entities that take part in the current graph. Nodes are rendered in different visual cues for representing priority, frequency, relevancy, etc. For example, nodes can be dynamically rendered in different sizes and automatically scaled based on the screen dimensions, while maintaining proportions relative to other nodes for representing importance, priority, relevancy, etc. to the selected relation type(s). Furthermore, the user can "hover" over a node using a mouse pointer or other input interface device. Hovering over a node can reveal information about the node (discussed in more detail later). Nodes can be moved by the user using an input interface device, like a mouse or a finger touch or other input, on the graph interface to view node labels obscured by other nodes.

The example graph 200 graphically represents an organizational chart showing the reporting structure for subject 202. The subject 202 is the largest node, while first tier associates, such as associate 204 and associate 205, are second largest. The second tier of associates, such as associate 206, is third largest, and so on. The tiers, in this case, are based on the proximity to the subject 202 based on the organizational chart. That is, subject 202 is shown to have three immediate subordinates and one immediate superior. Both the subordinates and superiors are shown as the same size, though that can be adjusted based on user preferences. Some second tier associates 206 are also shown. Whether third tier associates are shown is also based on user preferences, and may be based on the available space on the view screen. To that end, certain associates can be clustered together to save space (shown as a clustered node 208). Clustered node 208 can be clustered automatically for nodes deemed less relevant for the selected relation type.

Furthermore, multiple relation types can be selected, so the graph can show associations for different relation types. For example, the "reports to" relation can be selected, as well as a "same committee membership" relation. The graph would show associates having a "reports to" relationship with subject 202 and associates sharing the same committee membership as subject 202. For this example, data for both sets of relationships can come from the same source; however, the relationships selected for graphing may come from different sources, and the graph would render the associations based on data retrieved from one or more sources. So the "reports to" relation can be selected and a "Facebook friends" relation can be selected, and the rendering engine 108 would render the graph showing associations for both "reports to" and "Facebook friends."

Graph 200 connects associates and subjects using edges, such as edge 210 and edge 214. Different graph edges represent a connection between associates. Edge 210 (also referred to as association 210) has an arrow pointing towards subject 202, thereby indicating "reports to" information—associate 204 reports to subject 202; edge 214 (also referred to as association 214) has an arrow pointing away from subject 202, also conveying "reports to" information—subject 202 reports to associate 205. Second tier associates are connected to first tier associates by edges as well, such as edge 212, which may exhibit visual characteristics to convey information. The user may "hover" over the edge with a mouse pointer or other interface device, which can display information, such as the relationship or relevancy or other information. For example, hovering over edge 210 displays notation 211, which shows the "reports to" relation between associate 204 and subject 202.

Figure 3:
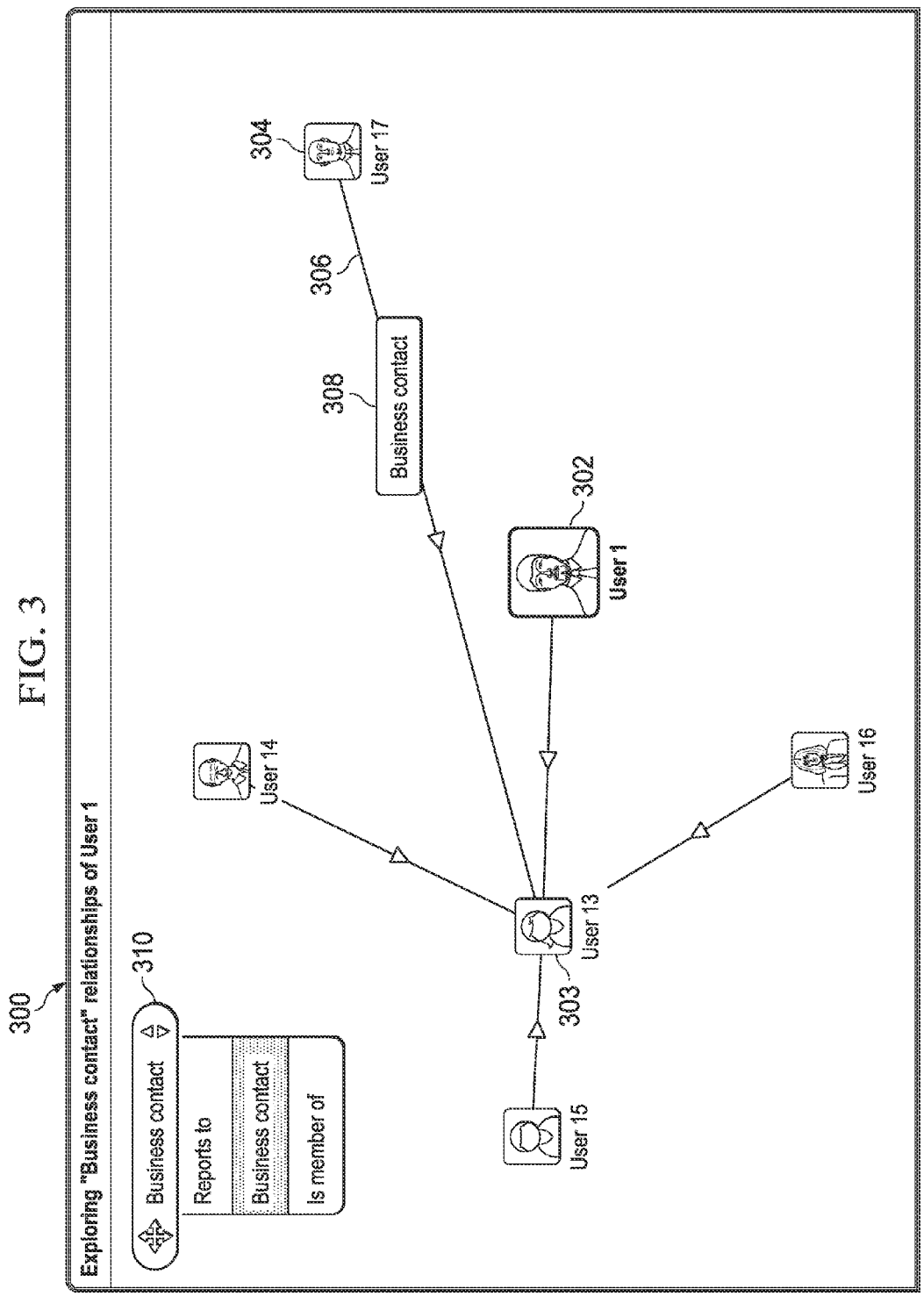
FIG. 3 is a schematic of an example graph showing a "business contact" relation type.

FIG. 3 is a schematic of an example graph 300 showing a "business contact" relation type. Different layers of network association information are rendered and can be selected by the user. In FIG. 3, subject 302 is shown connected to an associate 303. By selecting the "business contact" relation type from pull down menu 310, business contacts for subject 302 are displayed, as are business contacts for associate 303, such as associate 304, which is connected to associate 303 by association 306, which is a "business contact" association 308.

Figure 4:
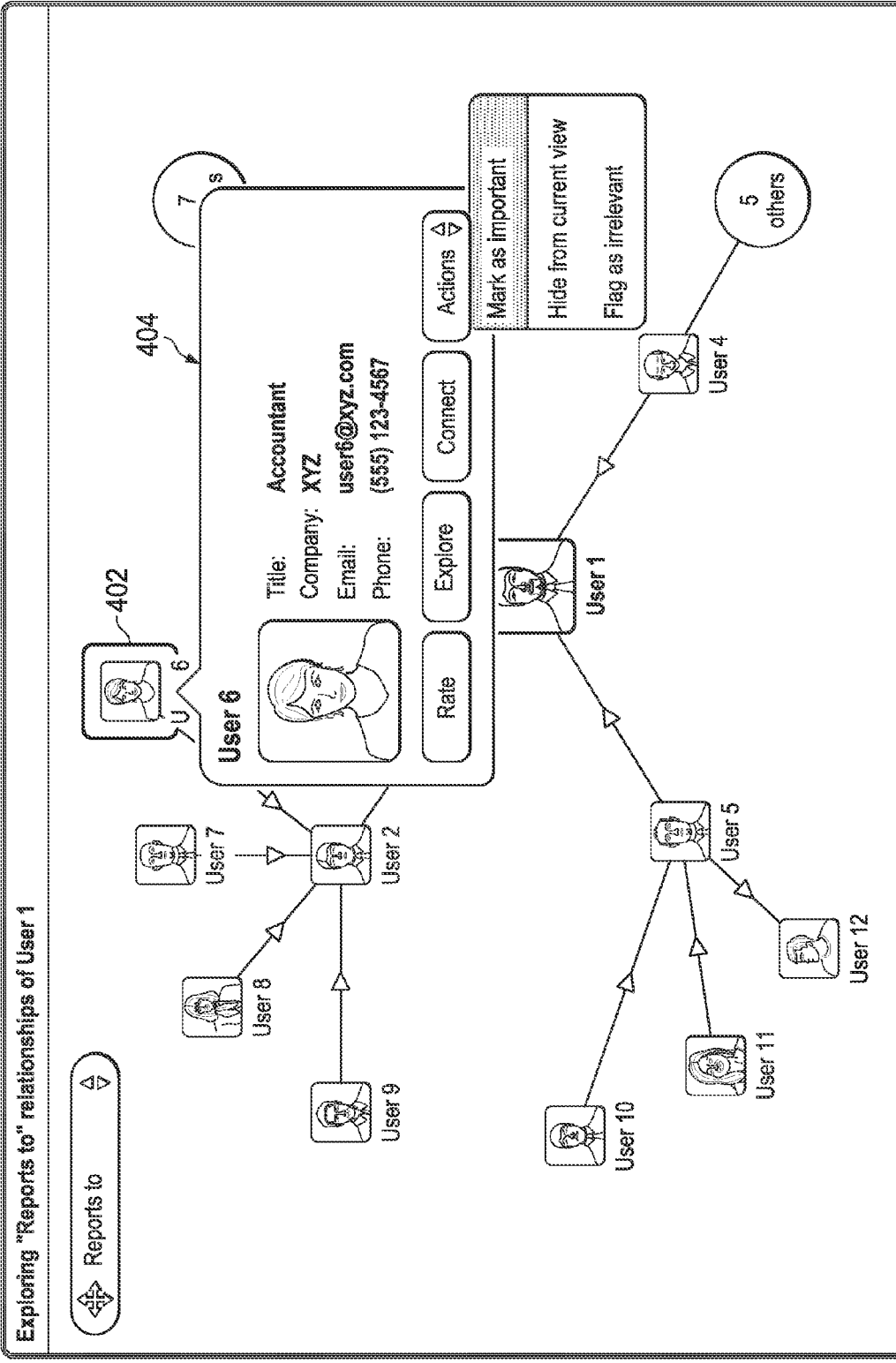
FIG. 4 is a schematic of an example graph showing an associate profile.

FIG. 4 is a schematic of an example graph 400 showing an associate profile. Hovering over a network associate, such as associate 402, shows an interface 404 with a list of available actions, which enables the user to perform certain actions. For example, the list of actions includes rating the network associate, marking the associate as important (or unmarking the associate), flagging the associate as irrelevant, hiding the associate from the current view, or other actions. Also, the interface 404 allows the user to explore the associate further or connect to the associate directly, for associates indirectly connected. Actions are taken into account by the rendering engine when calculating the current view and are persisted for future rendering of network associations.

Figure 5:
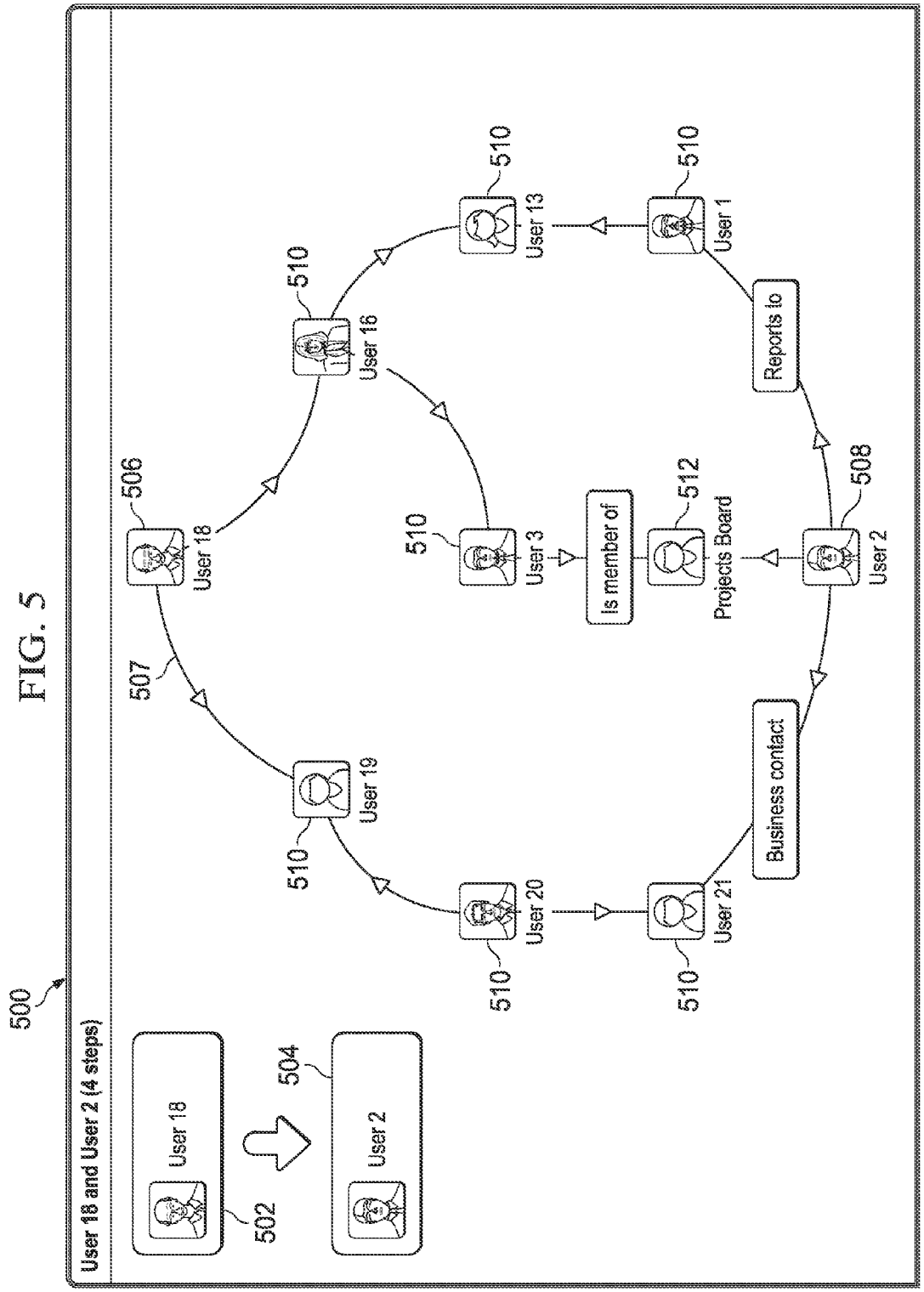
FIG. 5 is a graph of an alternative graph visualization of a network of associations.

FIG. 5 is a graph of an alternative graph visualization 500 of a network of associations. In graph 500, the rendering engine shows the available path between two network associates using available network associate connections. In this example, graph 500 shows network connections between associate 502 and associate 504. The graph 500 provides the visualization using nodes and edges, similar to that shown above. Associate 502 is shown as a node 506, and associate 504 is shown as a node 508. The nodes are connected by edges, such as edge 507. The graph shows the relation path between associate node 506 and associate node 508 and associate nodes 510 and 512. Associate node 512 is a node that represents an entity, as opposed to a person. Two associates can be selected: one can serve as a "source" and one a "target." The rendering engine renders multiple layers of network information using different network connection types (e.g., hierarchical, symmetric, asymmetric, etc.).

Figure 6:
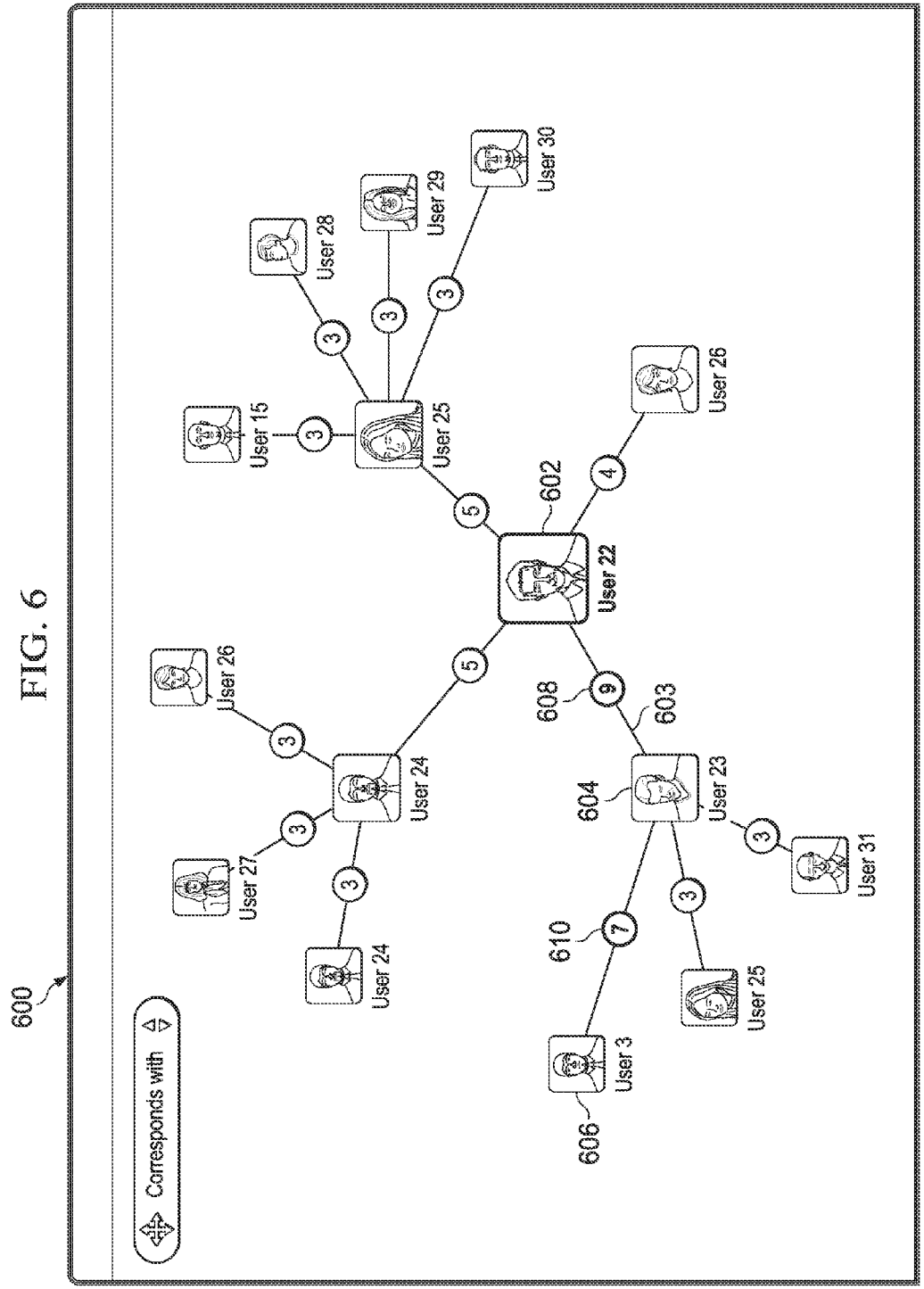
FIG. 6 is a graph of an alternative graph visualization of a network of associations.

FIG. 6 is a graph of an alternative graph visualization 600 of a network of associations. In graph 600, the "corresponds with" relation type is shown for subject 602. The graph shows associates satisfying the "corresponds with" relation type, such as associate 604 and associate 606. The associates are connected by association 603 that connects subject 602 and associate 604. The rendering engine shows network associations data on relevant edges using colors, strengths, or other visual cues to highlight the "strongest" connections for the current view. The numbers on the edges convey the weight of the relevancy according to the selected relation type, such as weight 608 and weight 610. Weights can be determined based on certain metrics, such as the frequency of e-mail exchange, user entered values, other information available, metadata used to establish view parameters, or other metrics.

Figure 7:
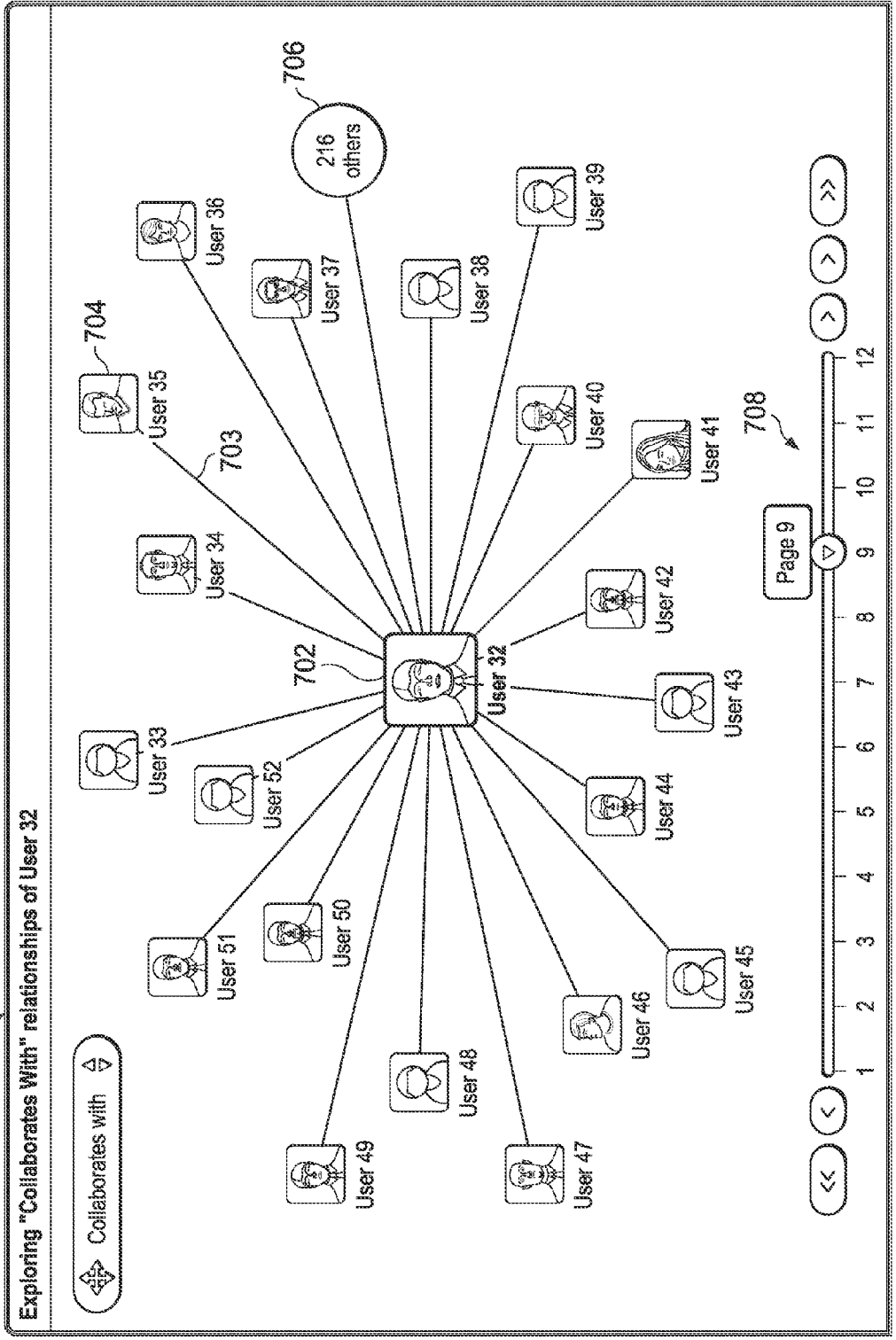
FIG. 7 is a graph of an alternative graph visualization of a network of associations.

FIG. 7 is a graph of an alternative graph visualization 700 of a network of associations. For large scale, complex networks of associations, the rendering engine switches to a view that dynamically fits the number of displayed entities and connections to the available screen dimensions. The user can browse between different pages of the network graph using the navigation bar 708 displayed on the visualization screen. Subject 702 is connected to associates, such as associate 704, by an edge 703. Nodes not available to be displayed on the view screen are clustered in a node cluster 706. Nodes (or a subset of nodes) in the node cluster 706 are displayed when the user scrolls the navigation bar 708. The navigation bar 708 can be dynamic, so the page range shown can be based on the number of associates for the subject 702. The associates shown on each page can be random, or can be arranged based on an order, such as by relevancy, by alphabet, or other parameters. A zoom bar can also be shown on the visualization to control the number of associates shown on each page. The nodes can be rearranged to control the nodes displayed on each page. In general, the arrangement of nodes can be persisted for each instantiation of the graph.

Figure 8:
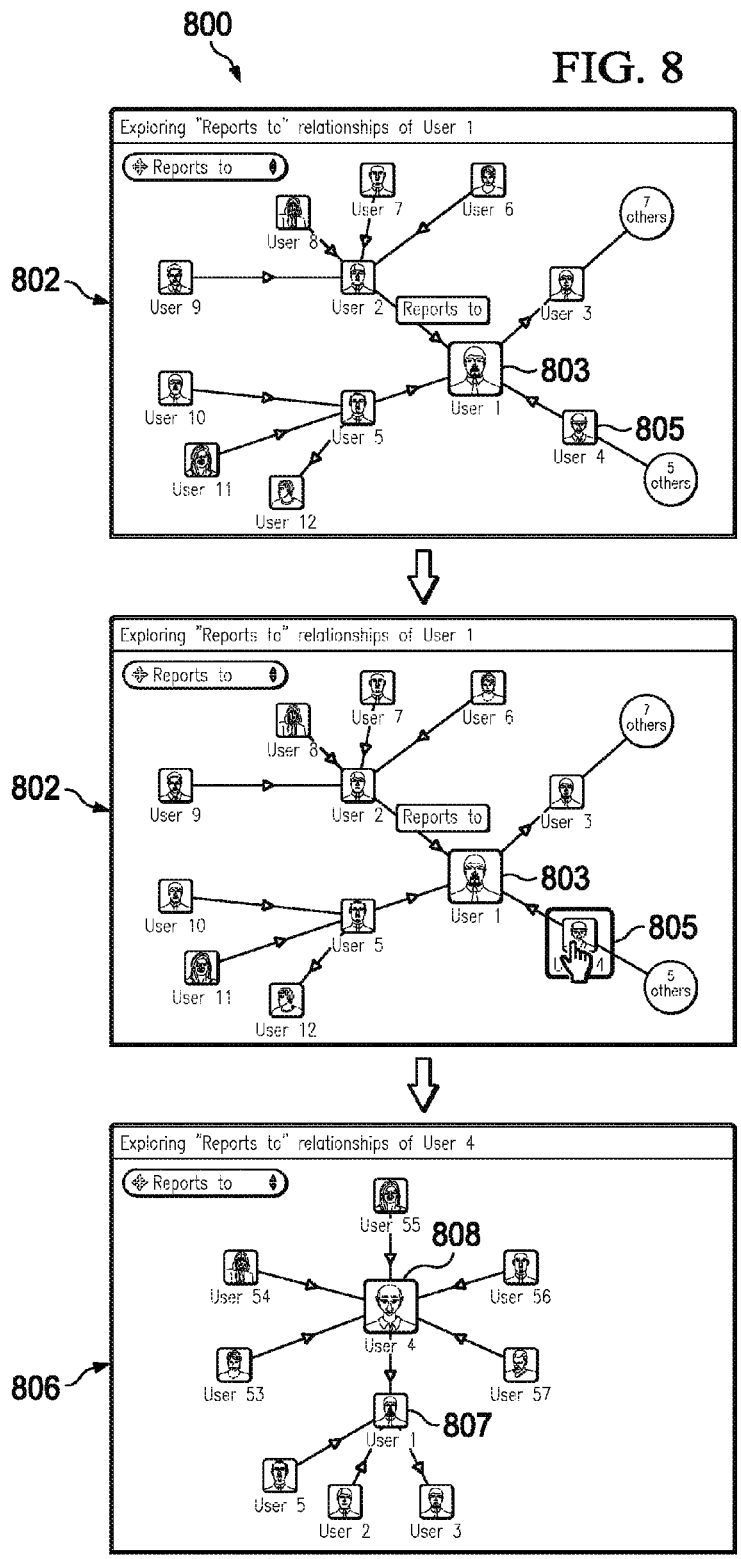
FIG. 8 is a schematic of a navigation from a first graph to a second graph.

FIG. 8 is a schematic 800 of a navigation from a first graph to a second graph. Graph 802 shows a visualization of a network of associations for subject 803. The user can perform a navigation to a different view of the network of associations where a different entity is considered to be the most relevant. The rendering engine can keep track of user interaction and navigation history, allowing the user to go back and forth between recently viewed network association representations. Subject 803 is connected to associates by edges, such as associate 805. Nodes representing associates can be selected by the user using an input device. For example, associate 805 can be clicked on using a mouse pointer, which opens a graph 806 of network of associations for associate 805. Graph 806 shows subject 808 (which was associate 805 from graph 802). Associate 807 is shown as a network connection, which was previous subject 803.

Figure 9:
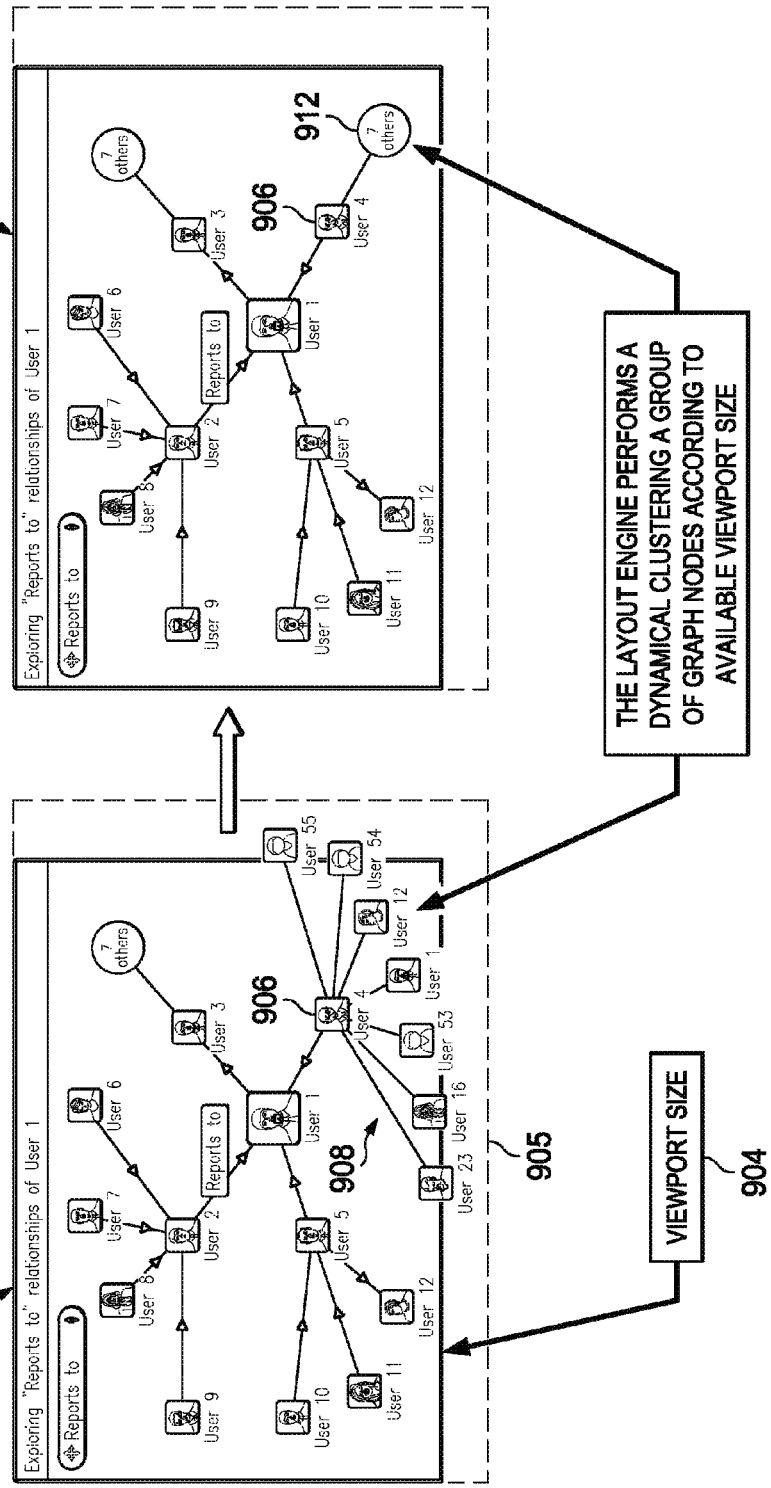
FIG. 9 is a schematic of a graph of network associations where nodes are clustered to fit a screen size.

FIG. 9 is a schematic of a graph of network associations 900 where nodes are clustered to fit a screen size. The graph 902 is shown in full view with associate node 906 having connections to associate nodes 908. The viewport size 904 is smaller than the size needed to show the entire graph 905. The rendering engine performs a dynamic clustering of the nodes for the available size of the viewport. The resulting graph 910 shows the associate node 906 connected to a node cluster 912. The node cluster 912 can be selected, which expands the cluster into its constituent nodes, and the graph is re-rendered to show the nodes. For example, the graph can "zoom out" making the nodes smaller, or another set of nodes can be clustered. Clustering can be dynamic and be based on relevancy, navigation history, or other metrics.

Figure 10:
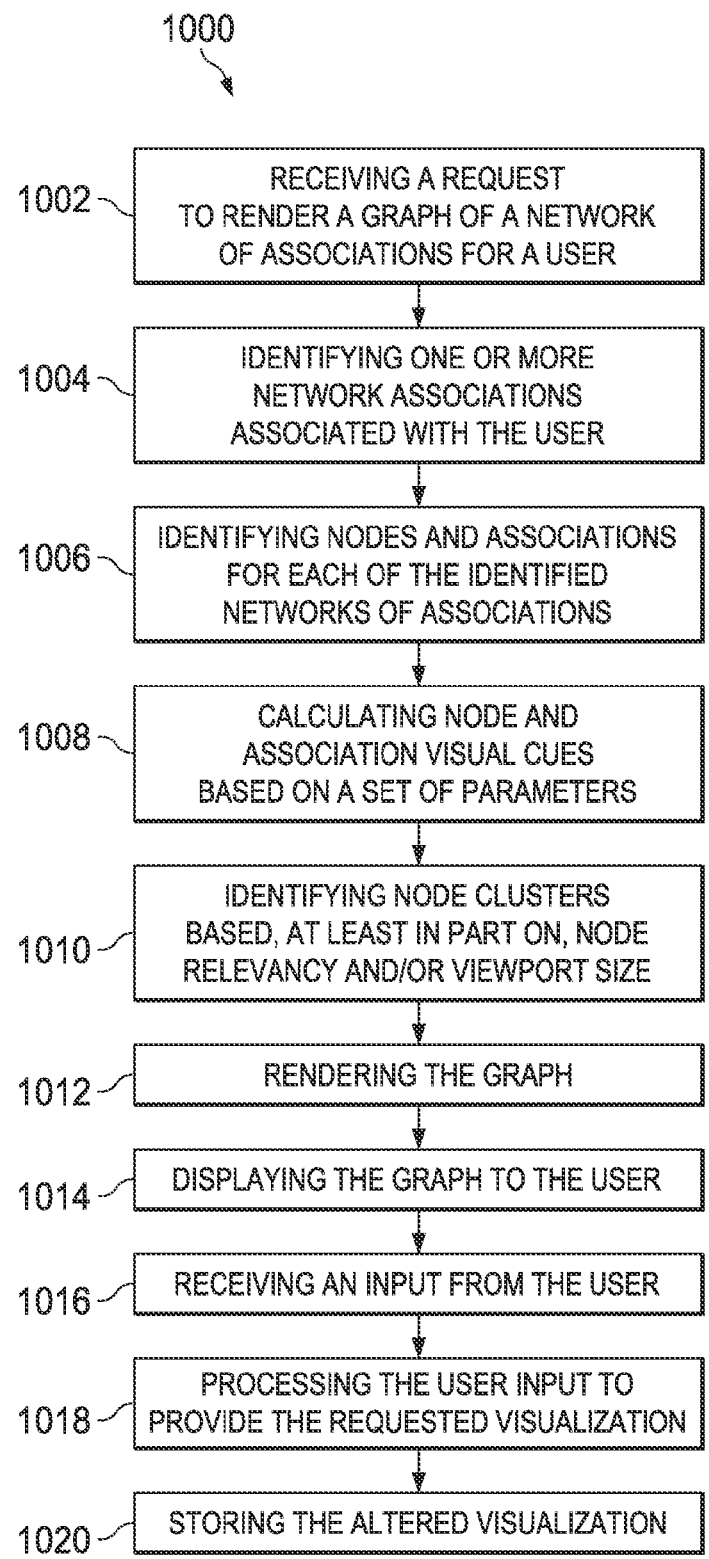
FIG. 10 is a process flow chart for providing a visualization of a network of associations as a graph.

FIG. 10 is a process flow chart 1000 for providing a visualization of a network of associations as a graph. A request to render a graph of a network of associations can be received from a user (1002). One or more networks of associations that are associated with the user can be identified (1004). The rendering engine can begin collecting node and association information for related networks of associations. The nodes and associations for the one or more networks of associations can be identified (1006). Node and edge visual cues can be calculated based on a set of parameters (1008). The parameters can be user inputs or can be identified by the rendering engine based on navigation history or other sources. Node clusters can also be identified based on relevancy and/or viewport size (1010). The graph can then be rendered (1012) and displayed to the user (1014). An input can be received from the user (1016). The input can be an alteration of the arrangement of the nodes in the graph, a hovering selection, a selection of a node for visualization, an expansion of a cluster, a change of the page, a zoom, or other user input. The input can be processed (1018). The alteration and navigation history and other input information can be stored (1020).

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method comprising:
identifying a network of associations for a first user with a plurality of second users according to a plurality of relation types, each relation type defining a type of relationship between the first user and a second user of the plurality of second users;
displaying, in a user interface, a plurality of objects, each object representing a relationship type;
receiving, in the user interface, a selection of a relation type;
in response to receiving the selection of the relation type:
identifying, from the network of associations, a sub-network of associations of the selected relation type for the first user with one or more second users, wherein the sub-network of associations includes first tier associations and second tier associations that are weaker than the first tier associations;
displaying, in the user interface, a visualization of the sub-network of associations of the selected relation type as a graph, the graph having an edge and a node, the node representing the one or more second users of the sub-network of associations and the edge representing an association between the one or more second users and the first user;
determining that insufficient space is available to display all of the second users that have second tier associations with the first user;
in response to determining that insufficient space is available to display all of the second users that have second tier associations with the first user:
clustering nodes that represent all of the second users that have second tier associations with the first user into a single node; and
displaying the single node in the user interface to represent all of the second users that have second tier associations with the first user.

2. The method of claim 1, wherein the network of associations comprises multi-layered data, wherein the multi-layered data includes one or more of group associations, hierarchical organization relevancy, behavior patterns, relevancy, priority, frequency, while maintaining user navigation history.

3. The method of claim 1, further comprising clustering the nodes that represent all of the second users based on a relevancy factor of the nodes that represent all of the second users.

4. The method of claim 1, wherein the selected relation type specifies a reporting structure between the first user and the one or more second users in the sub-network, and wherein the method further comprises displaying, in the user interface and on an edge that connects a node representing the first user and a node representing a second user in the sub-network, an arrow in a direction that indicates the reporting structure between the first user and the second user in the sub-network.

5. The method of claim 1, further comprising providing a recommendation to the user to adjust the graph based on a metric associated with the network of associations.

6. The method of claim 1, further comprising tracking a viewing history for the user.

7. The method of claim 1, wherein the received selection of the relation type is a first selection of a first relation type, wherein the sub-network of associations is a first sub-network of associations, and wherein the method further comprises:

receiving, in the user interface, a second selection of a second relation type that is different from the first relation type;

in response to receiving the second selection of the second relation type:

identifying, from the network of associations, a second sub-network of associations of the selected second relation type for the first user with one or more second users; and displaying, in the user interface, a visualization of the second sub-network of associations of the selected relation type as a graph, the graph having an edge and a node, the node representing the one or more second users of the second sub-network of associations and the edge representing an association between the one or more second users and the first user.

8. A non-transitory computer-readable medium storing instructions executable by one or more computer systems to perform operations comprising:

identifying a network of associations for a first user with a plurality of second users according to a plurality of relation types, each relation type defining a type of relationship between the first user and a second user of the plurality of second users;

displaying, in a user interface, a plurality of objects, each object representing a relationship type;

receiving, in the user interface, a selection of a relation type;

in response to receiving the selection of the relation type:

identifying, from the network of associations, a sub-network of associations of the selected relation type for the first user with one or more second users;

displaying, in the user interface, a visualization of the sub-network of associations of the selected relation type as a graph, the graph having an edge and a node, the node representing the one or more second users of the sub-network of associations and the edge representing an association between the one or more second users and the first user;

determining that insufficient space is available to display all of the second users that have second tier associations with the first user;

in response to determining that insufficient space is available to display all of the second users that have second tier associations with the first user:

clustering nodes that represent all of the second users that have second tier associations with the first user into a single node; and displaying the single node in the user interface to represent all of the second users that have second tier associations with the first user.

9. The medium of claim 8, wherein the network of associations comprises multi-layered data, wherein the multi-layered data includes one or more of group associations, hierarchical organization relevancy, behavior patterns, relevancy, priority, frequency, while maintaining user navigation history.

10. The medium of claim 8, wherein providing the visualization of node clusters is further based on a relevancy factor of nodes in the nodes cluster.

11. The medium of claim 8, wherein the nodes are visualized having visual characteristics for providing a visual representation of the relevancy to a user selected visualization preference.

12. The medium of claim 8, further comprising providing a recommendation to the user to adjust the graph based on a metric associated with the network of associations.

13. The medium of claim 8, further comprising tracking a viewing history for the user.

14. The medium of claim 8, wherein the received selection of the relation type is a first selection of a first relation type, wherein the sub-network of associations is a first sub-network of associations, and wherein the operations further comprise:

receiving, in the user interface, a second selection of a second relation type that is different from the first relation type;

in response to receiving the second selection of the second relation type:

identifying, from the network of associations, a second sub-network of associations of the selected second relation type for the first user with one or more second users; and displaying, in the user interface, a visualization of the second sub-network of associations of the selected relation type as a graph, the graph having an edge and a node, the node representing the one or more second users of the second sub-network of associations and the edge representing an association between the one or more second users and the first user.

15. A system for providing a graphic visualization of a network of associations comprising:

a hardware processor; and a memory for storing instructions, the instructions operable when executed by the hardware processor to perform operations comprising:

identifying a network of associations for a first user with a plurality of second users according to a plurality of relation types, each relation type defining a type of relationship between the first user and a second user of the plurality of second users;

displaying, in a user interface, a plurality of objects, each object representing a relationship type;

receiving, in the user interface, a selection of a relation type;

in response to receiving the selection of the relation type:

identifying, from the network of associations, a sub-network of associations of the selected relation type for the first user with one or more second users;

displaying, in the user interface, a visualization of the sub-network of associations of the selected relation type as a graph, the graph having an edge and a node, the node representing the one or more second users of the sub-network of associations and the edge representing an association between the one or more second users and the first user;

determining that insufficient space is available to display all of the second users that have second tier associations with the first user;

in response to determining that insufficient space is available to display all of the second users that have second tier associations with the first user:

clustering nodes that represent all of the second users that have second tier associations with the first user into a single node; and displaying the single node in the user interface to represent all of the second users that have second tier associations with the first user.

16. The system of claim 15, wherein the network of associations comprises multi-layered data, wherein the multi-layered data includes one or more of group associations, hierarchical organization relevancy, behavior patterns, relevancy, priority, frequency, while maintaining user navigation history.

17. The system of claim 15, wherein providing the visualization of node clusters is further based on a relevancy factor of nodes in the nodes cluster.

18. The system of claim 15, wherein the nodes are visualized having visual characteristics for providing a visual representation of the relevancy to a user selected visualization preference.

19. The system of claim 15, the operations further comprising providing a recommendation to the user to adjust the graph based on a metric associated with the network of associations.

20. The system of claim 15, the operations further comprising tracking a viewing history for the user.

21. The system of claim 15, wherein the operations further comprise:

receiving, in the user interface, a second selection of a second relation type that is different from the first relation type;

in response to receiving the second selection of the second relation type:
- identifying, from the network of associations, a second sub-network of associations of the selected second relation type for the first user with one or more second users; and
- displaying, in the user interface, a visualization of the second sub-network of associations of the selected relation type as a graph, the graph having an edge and a node, the node representing the one or more second users of the second sub-network of associations and the edge representing an association between the one or more second users and the first user.

* * * * *